(12) United States Patent
Kobayashi et al.

(10) Patent No.: US 8,271,632 B2
(45) Date of Patent: Sep. 18, 2012

(54) REMOTE ACCESS PROVIDING COMPUTER SYSTEM AND METHOD FOR MANAGING SAME

(75) Inventors: Emiko Kobayashi, Yokohama (JP); Kiminori Sugauchi, Yokohama (JP); Toui Miyawaki, Kawasaki (JP); Satoshi Kikuchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 527 days.

(21) Appl. No.: 11/607,317

(22) Filed: Nov. 30, 2006

(65) Prior Publication Data
US 2008/0275962 A1    Nov. 6, 2008

(30) Foreign Application Priority Data
Dec. 1, 2005   (JP) .................. 2005-347421

(51) Int. Cl.
*G06F 15/173* (2006.01)
*G06F 15/16* (2006.01)
*G06F 1/00* (2006.01)
*H04W 4/00* (2009.01)

(52) U.S. Cl. ........ 709/223; 713/300; 370/338; 709/219; 709/224

(58) Field of Classification Search .......... 709/220–222, 709/223–226
See application file for complete search history.

(56) References Cited

U.S. PATENT DOCUMENTS

| | | | |
|---|---|---|---|
| 2002/0112052 A1* | 8/2002 | Brittingham et al. | 709/224 |
| 2003/0172069 A1 | 9/2003 | Uchiyama et al. | |
| 2004/0010541 A1* | 1/2004 | Allen et al. | 709/203 |
| 2004/0071123 A1* | 4/2004 | Shin | 370/338 |
| 2004/0158630 A1* | 8/2004 | Chang et al. | 709/224 |
| 2004/0210348 A1* | 10/2004 | Imhof et al. | 700/275 |
| 2005/0050148 A1* | 3/2005 | Mohammadioun et al. | 709/206 |
| 2005/0138439 A1* | 6/2005 | Rothman et al. | 713/300 |
| 2005/0198245 A1* | 9/2005 | Burgess et al. | 709/223 |

FOREIGN PATENT DOCUMENTS

| | | |
|---|---|---|
| EP | 1054529 A2 | 5/2000 |
| JP | 2002183479 A * | 6/2002 |
| WO | WO 2005/101205 A1 | 10/2005 |

OTHER PUBLICATIONS

Michael Kaminsky; Decentralized User Authentication in a Global File System; 2003; ACM; 1-58113-757; 60-73.*

* cited by examiner

*Primary Examiner* — Haresh N Patel
*Assistant Examiner* — Evans Desrosiers
(74) *Attorney, Agent, or Firm* — Kilpatrick Townsend & Stockton LLP

(57) ABSTRACT

A computer system for providing a remote access service includes a unit for acquiring information on a relation between a terminal and a user using the terminal, a unit for acquiring network information about the terminal, a unit for acquiring network information about a blade that the terminal will access, a unit for acquiring information on a relation between the blade and a storage area, and a management server for extracting information on the user and its usage information and providing these information in real time. The management server also has a unit for permitting an administrator of the management server, persons other than the user and a management program to use the blade.

15 Claims, 15 Drawing Sheets

| 401 | USER ID | user1 |
|---|---|---|
| 402 | USAGE STATE | CONNECTED |
| 403 | TERMINAL IP ADDRESS | xxx.xxx.xxx.xxx |
| 404 | COMPUTER ID | pc1 |
| 405 | STORAGE AREA ID | str1_1 |
| 406 | START TIME | 2005/01/01 10:01:00 |
| 407 | END TIME | 2004/12/31 23:00:00 |

FIG.5

| 501 | COMPUTER ID | pc1 |
|---|---|---|
| 502 | ADDRESS 1 | xxx.xxx.yyy.yyy |
| 503 | ADDRESS 2 | xxx.xxx.zzz.zzz |
| 504 | POWER STATUS | on |
| 505 | SERVICE STATE | up |
| 506 | REMOTE TERMINAL ADDRESS | xxx.xxx.xxx.xxx |
| 507 | START TIME | 2005/01/01 10:00:00 |
| 508 | SHUTDOWN TIME | 2004/12/31 23:01:00 |

FIG.6

| 601 | USER ID | user1 |
|---|---|---|
| 602 | TERMINAL ADDRESS | xxx.xxx.xxx.xxx |
| 603 | AUTHENTICATION TIME | 2005/01/01 09:59:00 |

FIG.8

| | | |
|---|---|---|
| 801 | COMPUTER ID | pc1 |
| 802 | TYPE | DISKLESS |
| 803 | ADDRESS 1 | xxx.xxx.yyy.yyy |
| 804 | ADDRESS 2 | xxx.xxx.zzz.zzz |
| 805 | POWER STATUS | on |
| 806 | SERVICE STATE | up |
| 807 | REMOTE TERMINAL ADDRESS | xxx.xxx.xxx.xxx |
| 808 | START TIME | 2005/01/01 10:00:00 |
| 809 | SHUTDOWN TIME | 2004/12/31 23:01:00 |
| 810 | STATE OF USE | user1 |

FIG.9

| | | |
|---|---|---|
| 901 | DEVICE ID | str1 |
| 902 | LU NUMBER | 1 |
| 903 | USER ID | user1 |
| 904 | ADDRESS | xxx.xxx.zzz.xxx |
| 905 | COMPUTER ADDRESS | xxx.xxx.zzz.zzz |
| 906 | STATUS | AVAILABLE |

FIG.14

| | | |
|---|---|---|
| 1401 | COMPUTER ID | pc1 |
| 1402 | INTERFACE NUMBER | if1 |
| 1403 | IP ADDRESS | xxx.xxx.yyy.yyy |
| 1404 | SUBNET ADDRESS | xxx.xxx.0.0 |
| 1405 | REMOTE ADDRESS | xxx.yyy.xxx.xxx |
| 1406 | ON-ROUTE DEVICE ADDRESS | xxx.xxx.1.1 |
| | | xxx.yyy.1.1 |
| 1407 | INTERFACE NUMBER | if2 |
| 1408 | IP ADDRESS | xxx.xxx.zzz.xxx |
| 1409 | SUBNET ADDRESS | xxx.xxx.zzz.0 |
| 1410 | REMOTE ADDRESS | xxx.xxx.zzz.zzz |
| 1411 | ON-ROUTE DEVICE ADDRESS | — |

FIG.19

| 1801 | RESERVER ID | Admin |
|---|---|---|
| 1802 | RESERVATION TIME | 2005/01/01 09:59:00 |
| 1803 | RESERVED OBJECT | pc1 |

FIG.20

USER ID, TERMINAL IP ADDRESS, USED COMPUTER ID, START TIME/END TIME user1,xxx.xxx.xxx.xxx,pc1,2005/01/01 10:00:00-2005/01/01 14:00:00
user2,xxx.xxx.xxx.zzz,pc2,2005/01/02 11:00:00-2005/01/02 20:00:00
⋮

REMOTE ACCESS PROVIDING COMPUTER SYSTEM AND METHOD FOR MANAGING SAME

INCORPORATION BY REFERENCE

The present application claims priority from Japanese application JP2005-347421 filed on Dec. 1, 2005, the content of which is hereby incorporated by reference into this application.

BACKGROUND OF THE INVENTION

The present invention relates to a computer system in which a particular user logs in to a remote computer via network by using an unspecified terminal to access a particular external storage device, and more particularly to a technology for managing this system.

As the Internet becomes more widespread, there is a growing call for the user to be able to send or receive mail, access Web sites, create documents and perform other works using personal computers at places away from his or her office, at home or other places than those where such computer-related works are normally executed. To meet this demand, a system has been in service by which the user can access his or her computer at a remote location (workplace) from an electronic terminal at hand through the network and display a computer desktop screen on the electronic terminal (terminal service).

There are two types of the terminal service.

One type allows multiple users to share one computer at a remote location and the other is a P2P (Peer to Peer) type in which one user occupies one remote computer. The P2P is also called a remote desktop function.

In the P2P type, using an arbitrary client terminal (hereinafter simply referred to as a "terminal"), each user can freely set his or her own environment and applications in a remote computer through the network. As long as the remote computer is reachable in terms of the Internet protocol of the network (IP reachable), there are no limitations on the kind of client terminal, geographical positions of the user, and the kind of communication line used, e.g., whether it is wired or wireless.

As one example of the P2P type terminal service, WO2005/101205A1 may be cited. This patent document, however, describes simply identifying a client terminal connected to the remote computer according to an IP address and authenticating the user using the client terminal and does not fully consider the management between the user and the system.

In a conventional voice telephone system where the user uses a service through an arbitrary terminal, one method for identifying the user using the terminal in order to charge for each user involves acquiring information on the user and the terminal during the process of user authentication as shown in EP1054529A. Another conventional method involves managing a correspondence between the user and a server computer that the user accesses and linking an access to the storage device made by the server computer of interest to the user as shown in 2003-330622.

An example of system configuration for the P2P type terminal service centralizes all remote computers accessed by users at a center. The centrally located remote computers may use a computer unit comprised of one printed circuit board, called a blade, on which CPU, I/O and other electronic devices are mounted. There is another system configuration in which a plurality of blades with no storage area (hereinafter referred to as diskless blades) connect to an external storage through network. Each user makes an access from the client terminal through the network to one of the diskless blades, which loads an operating system (OS) and application software from the external storage and executes them.

In the latter system configuration, if a storage area in the external storage is allotted to users as storage areas unique to respective users, the user can build his or her own environment by simply accessing the user's unique storage area from any terminal through any blade. In this case, there is no need to specify the terminal or blade. The diskless blade can load individual users' personal environments by mounting the users' unique storage areas.

In such system configurations, however, since the blades are allotted to the users, an administrator of the blades needs to ensure that an authorized user uses an authorized blade and accesses an authorized storage area. For this purpose, it is necessary to acquire information on the users, client terminals, blades and storage areas and the correspondence among them. Conventional technologies have not given sufficient consideration to these problems.

If the system can acquire such correspondence information and build system component relations and if the blade administrator can centrally manage these system component relations, the blade administrator can not only maintain the blades and other hardware but also update and modify the operating system and application software, the user's personal environment.

In the terminal service, when the screen on the user's client terminal does not function normally, for example, the user cannot decide whether this has been caused by a communication failure or abnormal halt of OS, unlike in a situation where hardware resources are available near the user. So, the administrator of the remote computers must deal with troubles of the users. Communication failures need to be notified to the user. Therefore, the administrator is required to know the state of use, i.e., which user is using which blade, and perform necessary works for the user such as restoring failed OS, updating software and modifying programs. Conventional technologies do not take sufficient measures in these respects.

In a remote access system that uses blades for the centralized computers and assigns storage areas accessed by the blades to individual users, the user may use a different blade in each access. Further, the user may use a different client terminal in each access. Since the client terminal for the user is not fixed, the IP address may change from one session to another. Therefore, the user using a particular blade cannot be identified from only the IP address information on the client terminal connected to that blade.

For example, the technology disclosed in WO2005/101205A1 does not make clear how the system acquires the network information that the client terminal has. In the technology in JP-A-2001-044992, the server to which the user connects is fixed and the relation between the user and the terminal used is only acquired during connection. In the technology in JP-A-2003-330622, when setting an authority to access the storage area, user information as well as an identifier of the server computer and port identifier is managed. But the relation between the user and the blade is not preset.

In a remote access system that uses blades for the centralized computers, assigns IP addresses of the users' client terminals to blades and allocates the storage area to individual users, since the relation among the user, client terminal, blade and storage area accessed by the blade changes from one session to another, real-time information acquisition and management is difficult depending on the conventional technology.

SUMMARY OF THE INVENTION

In a computer system that offers a remote access service via network, it is an object of this invention to provide a technology which allows a predetermined server and other management device to acquire information on the relation among the user, client terminal, remote computer (blade) and storage area accessed by the blade and other management information in real time and manage them integrally. It is also an object of this invention to provide a system which allows the administrator to check the state of use of the blades as required, update the user environment including blades and software and execute a restoration procedure in the event of failure. Here the management device includes a physical server. The management device also includes a plurality of virtual servers mounted in one computer system. Further, one computer system includes one virtual computer system built by a clustering technique using a plurality of physical computers.

To achieve the above objective, the present invention provides 1) a remote access providing computer system which includes two or more client terminals, a management device and two or more remote computers, all interconnected via networks, and provides a user using one of the client terminals with an access to one of the remote computers, the remote access providing computer system comprising:

a unit for acquiring information on a relation between one of the client terminals and a user using the terminal;

a unit for acquiring network information about the client terminal;

a unit for acquiring network information about one of the remote computers (blades) that the client terminal will access;

a unit for acquiring information on a relation between the blade and a storage area; and a predetermined management server for extracting information on the user and its usage information and providing these information in real time.

The predetermined management server also has a unit for permitting an administrator of the server, persons other than the authenticated user for the blade and a management program to use the blade. Furthermore, the present invention provides 2) a remote access providing computer system which includes two or more client terminals, a management device and two or more remote computers, all interconnected via networks, and provides a user using one of the client terminals with an access to one of the remote computers, the remote access providing computer system comprising:

a first software unit built to allow the management device to acquire information about the remote computer;

a second software unit built to allow the management device to, after the client terminal has connected to the remote computer, acquire network information on the client terminal through the remote computer;

a third software unit built to allow the management device to recognize the network information on the client terminal; and a fourth software unit built to allow the management device to recognize information on the user and the client terminal.

The present invention also provides 3) a remote access providing computer system which includes two or more client terminals, two or more servers and two or more remote computers, all interconnected via networks, and provides a user using one of the client terminals with an access to one of the remote computers, the remote access providing computer system comprising:

a first software unit built to allow one of the servers to acquire information about one of the remote computers;

a second software unit built to allow the server to, after the client terminal has connected to the remote computer, acquire network information on the client terminal through the remote computer;

a third software unit built to allow a second server to acquire the network information on the client terminal from the first server; and a fourth software unit built to allow the second server to acquire information on the user and the client terminal from a third server.

The present invention also provides 4) a system according to 3) above further including:

a fifth software unit built to allow the second server to acquire mount information about a storage area of the remote computer from a fourth server.

The present invention also provides 5) a remote access providing computer system which includes two or more client terminals, two or more servers and two or more remote computers, all interconnected via networks, and provides a user using one of the client terminals with an access to one of the remote computers, the remote access providing computer system comprising:

a first software unit built to allow a second server to associate information uniquely identifying the client terminal with the user and record them;

a second software unit built to allow a first server to associate the user with the remote computer and record them;

a third software unit built to allow the first server to, after the client terminal has connected to the remote computer, acquire network information on the client terminal through the remote computer;

a fourth software unit built to allow the second server to acquire network information on the remote computer from the first server; and a fourth software unit built to allow the second server to acquire information on storage area allotted to the user.

The present invention also provides 6) a remote access providing computer system which includes two or more client terminals, two or more servers and two or more remote computers, all interconnected via networks, and provides a user using one of the client terminals with an access to one of the remote computers, the remote access providing computer system comprising:

a first software unit built to allow a second server to associate information uniquely identifying the client terminal with the user and record them;

a second software unit built to allow a first server to associate the user with the remote computer and record them;

a third software unit built to allow the second server to acquire mount information about a storage area of the remote computer from the first server;

a fourth software unit built to allow the first server to, after the client terminal has connected to the remote computer, acquire network information on the client terminal through the remote computer; and a fifth software unit built to allow the second server to acquire from a third server connection information about network devices to which the remote computer connects, a network address of the remote computer and path information from the remote computer to a broadcast domain to which the client terminal connects.

The present invention also provides 7) a system according to 6) above further including:

a sixth software unit built to allow the second server to acquire IP address information assigned to a port of the remote computer connecting to an external storage device and IP address information of the associated external storage device.

With this invention, a management system can be realized which provides to a blade administrator in real time a relation among the user performing a remote access through a network, the client terminal currently used by the user, the remote computer (blade) which the terminal accesses, and the storage area of an external storage device that the blade accesses, and also other management information.

Other objects, features and advantages of the invention will become apparent from the following description of the embodiments of the invention taken in conjunction with the accompanying drawings.

BRIEF DESCRIPTION OF THE DRAWINGS

FIG. 5 is a configuration diagram of a computer management table for a blade 107 in embodiment 1.

FIG. 6 is a configuration diagram of a user management table managed by an authentication server 102 in embodiment 1.

FIG. 8 is a configuration diagram of a computer information table managed by the service management server 101.

FIG. 9 is a configuration diagram of a storage area management table managed by an external storage device management server 104 in embodiment 1.

FIG. 14 is a configuration diagram of a network information table managed by a service management server 101 in embodiment 3.

FIG. 19 is a configuration diagram of a reservation management table in the service management server in embodiment 4.

FIG. 20 is an example log output regarding the use of service by the user 100 in embodiment 4.

DESCRIPTION OF THE EMBODIMENTS

Embodiments of the present invention will be described in the following.

1. First Embodiment

Figure 1:
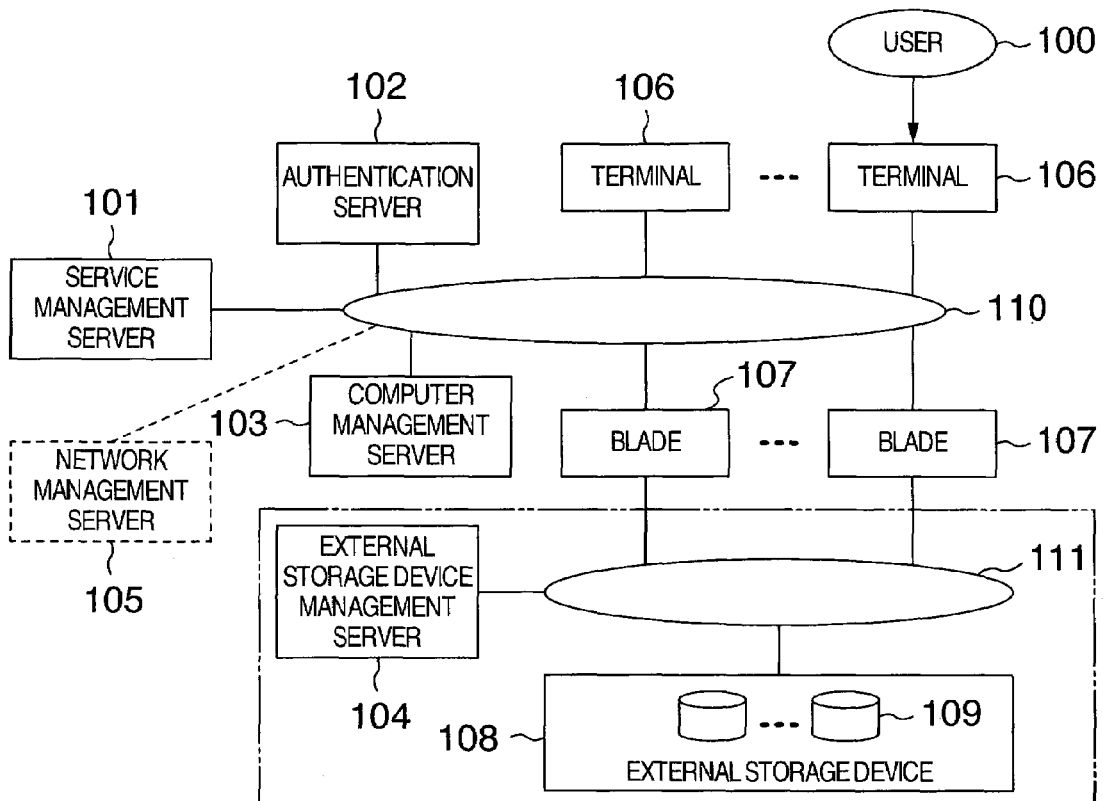
FIG. 1 is a system configuration diagram of a remote access service in embodiment 1 of this invention.

FIG. 1 shows a system configuration of one embodiment of this invention.

A network 110 interconnects a plurality of terminals 106 located at the user 100, a plurality of computers (blades) 107 (hereinafter referred to simply as blades 107) accessed by the terminals, a computer management server 103 to manage the blades 107, a service management server 101 to be described later, and an authentication server 102.

If the blades 107 are diskless blades that have no hard disk inside or other external storage devices, they are further connected to another network 111. The network 111 is connected with one or more external storage devices 108 and also with an external storage device management server 104 that manages storage areas in the external storage devices 108. Each of the external storage devices 108 divides its own storage area into one or more logical disk units 109 for management.

Although FIG. 1 shows the network 110 and the network 111 to be separate networks, they may be one and the same network. Further, while the authentication server 102, the service management server 101, the computer management server 103, the external storage device management server 104 and the network management server 105 are shown to be separate devices, these servers may be software programs that realize their functions. These programs may be installed in one and the same hardware device or in a plurality of hardware devices.

A system configuration using the network management server 105 will be explained in the Third Embodiment.

(1) Case where Blades 107 have External Storage Devices

First, a case where the blades 107 have external storage devices, i.e., the blades 107 are not diskless blades, will be described. In this case, the system configuration is that of FIG. 1 removed of the network 111, the external storage devices 108, the external storage device management server 104 and the network management server 105. The blades 107 are devices that have hard disks and other external storage devices to store OS, applications and other software programs used in jobs and data, memories to load software, and a CPU to execute these programs. The blades 107 offer the P2P type terminal service.

The terminals 106 are computers having a keyboard, a mouse, other user interface devices and a display and transmit control information on the user interface devices to the blades 107. Desktop screen information transmitted from a desktop computer at a workplace and stored in the external storage device of the blade 107 is sent from the blade 107 to the terminal 106 and displayed on the terminal 106.

Figure 2:
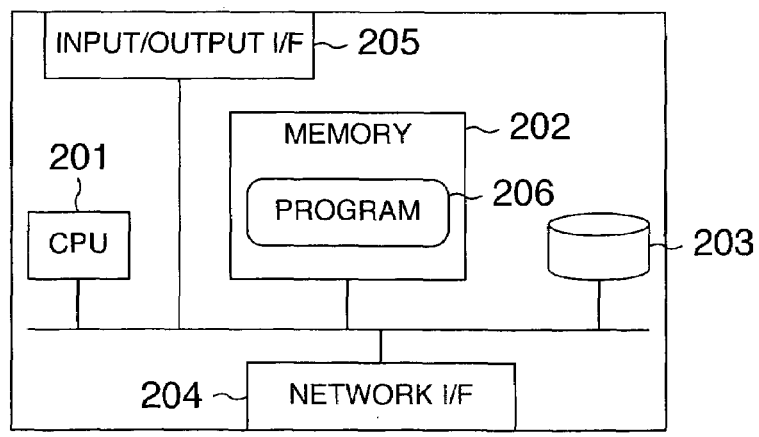
FIG. 2 is a configuration diagram of a service management server 101 in embodiment 1.

FIG. 2 shows a configuration of the service management server 101.

The service management server 101 has a CPU 201, a memory 202, an external storage device 203, one or more network interface 204, and an input/output interface 205. A service management program 206 is stored in an external storage device and loaded into the memory 202 for execution by the CPU 201.

The authentication server 102 and the computer management server 103 also have the similar configurations, and the programs to be executed are a user management program and a computer management program, respectively.

Figures 3, 4:
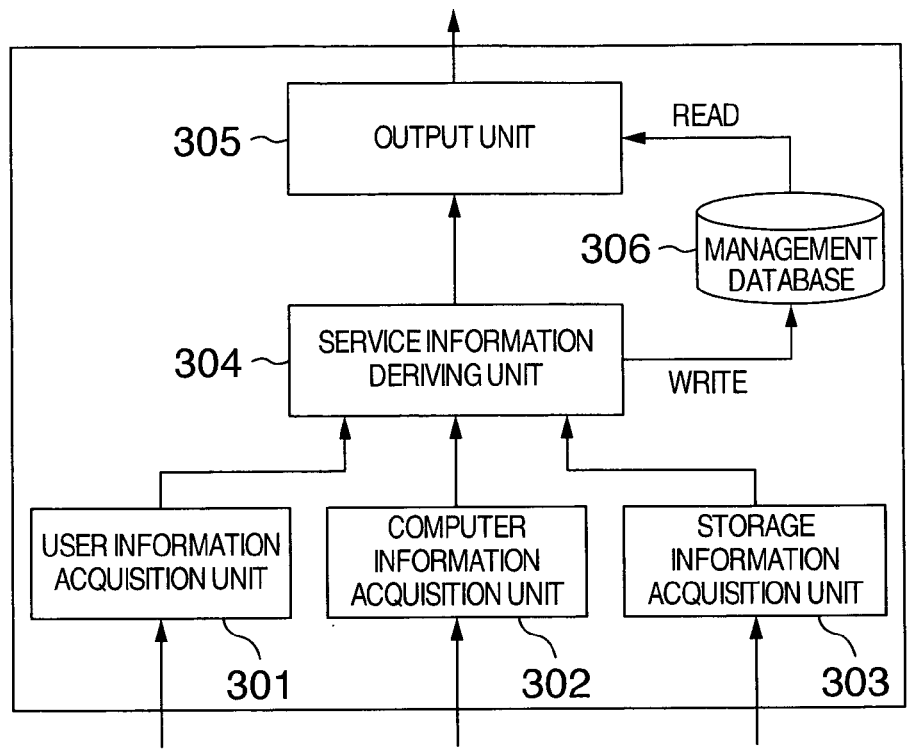
FIG. 3 is a functional module configuration diagram of a service management program executed by the service management server 101 in embodiment 1.
FIG. 4 is a configuration diagram of a service usage information management table managed by the service management server 101 in embodiment 1.

FIG. 3 shows a functional module configuration in the service management program executed by the service management server 101 (FIG. 2).

The service management program comprises: a user information acquisition unit 301 to acquire information on the user 100 from the authentication server 102; a computer information acquisition unit 302 to acquire information on the managed blades 107; a storage information acquisition unit 303 to acquire information on the external storage device and storage areas; a service information extracting unit 304 to extract information on the use of terminal service and other management information, a management database (management DB) 306 to store extracted management information, and an output unit 305 to supply management information to be displayed.

FIG. 4 shows a configuration of usage information table managed by the service management server 101.

The usage information table has registered therein information extracted by the service information extracting unit 304. The table has a user ID field 401, a usage state field 402, a terminal IP address field 403, a computer ID field 404 for computer identifier used by the user 100, a storage area ID field 405 to identify an external storage device ID and a logic unit (LU) number, a latest use start time field 406, and a latest use end time field 407.

The terminal IP address field 403 specifies an IP address. Information other than the IP address may be used in this field as long as it can uniquely identify the client terminal. So, the word "IP address" used in the following can be interchanged with the applicable information.

The usage state field 402 is managed by states "connected", "interrupted" and "stopped".

The "connected" state refers to a state in which the terminal service is in operation in a remote computer, i.e., blade 107, and in which the user terminal 106 of the user 100 is connected to the blade 107. The "interrupted" state refers to a state in which the terminal service is running in the remote computer or blade 107 but the terminal 106 is not connected to the blade 107. The "stopped" state refers to a state in which the terminal service is stopped in the remote computer and the terminal 106 of the user 100 is not connected to the blade 107.

The management database 306 has registered therein the acquired information, the computer information and the storage information as a user management table, a computer management table and a storage management table, respectively.

The user ID field 401 uniquely identifies an entry in the user management table; the computer ID field 404 uniquely identifies an entry in the computer management table; and the storage area ID field 405 comprised of the external storage device ID and LU number uniquely identifies an entry in the storage management table.

FIG. 5 shows a computer management table for the blade 107 managed by the computer management server 103.

The computer management table has a computer ID field 501 in which to register a computer identifier, address fields 502, 503 in which to set an IP address and a port number as computer network interface information, a power state field 504 in which to set a power-on or off state of the blade 107, a service state field 505 in which to set a terminal service start or stop state, a remote terminal address field 506 in which to set an IP address and port number of a remote terminal of network connection, a start time field 507 indicating a start time of the terminal service, and a shutdown time field 508 indicating a previous shutdown time.

As for the address field (502, 503), one or more fields are used according to the number of network interfaces. In this embodiment, two address fields are provided because the blade 107 is supposed to have two network interfaces.

The state registered in the service state field 505 is either up (the terminal service is started) or down (the terminal service is stopped). When OS is started, the terminal service is also started. When the terminal service is stopped, the operation of OS, application software and other programs are also stopped.

FIG. 6 shows a configuration of the user management table managed by the authentication server 102.

It has a user ID field 601 in which to register an identifier of the authenticated user 100, a local terminal address field 602 in which to register an IP address of a local terminal (client terminal), and an authentication time field 603.

Figure 7:
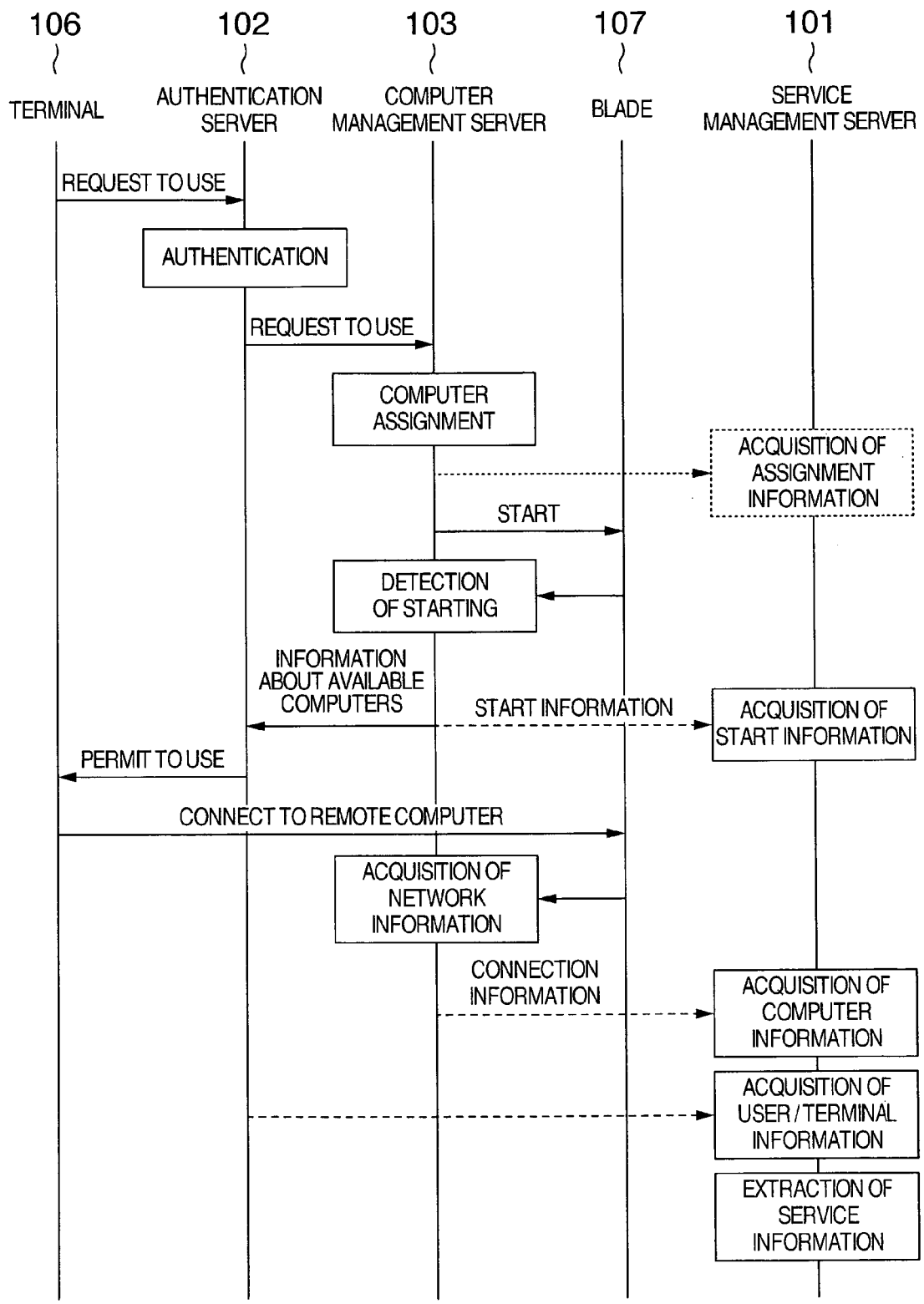
FIG. 7 is a diagram showing a sequence of steps performed among a terminal 106, a blade 107 and servers (101, 102, 103) in embodiment 1.

FIG. 7 shows a sequence of steps performed among the terminal 106 (FIG. 1), the remote computer (blade 107) and the servers (101, 102, 103).

The user 100 using the terminal 106 issues a remote access service request to the authentication server 102 through the network 110. The authentication server 102 checks whether the user 100 is an authorized user of the service and records a user identifier, an IP address as the information on the terminal being used and also the time when the user was authenticated. When the authentication fails, the server notifies the terminal 106 of the user 100 that the user cannot use the service.

Next, for the user 100 who has passed the authentication, the authentication server 102 notifies the service request to the computer management server 103, which then determines the blades available for use. The computer management server 103 may manage the information about the blades available for use by the user 100 and notify it to the service management server 101.

If the blade 107 permitted to be used by the user 100 is not yet started, the computer management server 103 starts the blade 107. When the start of the blade 107 is detected, the computer management server 103 notifies the permission to use and the information on the blade 107 to the user 100 of the terminal 106 through the authentication server 102.

The terminal 106 of the user 100, upon reception of the permission from the authentication server 102, connects to the remote blade 107. The computer management server 103 acquires the connection information (network information) of the terminal 106 through the blade 107.

As for the method for the computer management server 103 to detect the start of the blade 107 and acquire the connection information on the terminal 106, there are two methods as follows.

1) A notification program is installed beforehand in the blade 107 and is started when the blade 107 is started. The blade 107 sends a start notification to the computer management server 103. The blade 107 also monitors its own network connection information and, when there is a change in the connected state, sends network connection information to the computer management server 103.

2) The computer management server 103 periodically refers to the blade 107 for the start state and connection information and acquires these information. Either method may be used for acquiring the information.

When the blade 107 is started, the service management server 101 acquires the start information from the computer management server 103. There are two acquisition methods. In one method the computer management server 103 detects the start of the blade 107 and at the same time notifies the start to the service management server 101. The other method involves the service management server 101 periodically referring to the computer management server 103 for any newly started blade 107. Either method will do.

After the terminal 106 has started to connect to the blade 107, the service management server 101 acquires the connection information on the blade 107 from the computer management server 103. It also acquires information on the user 100 and its terminal 106 from the authentication server 102. Based on the information obtained, the service management server 101 extracts the service usage information from the relations among the user 100 that has initiated the connection procedure, its terminal 106 and the remote blade 107.

(2) Case where Blades 107 have No External Storage Device

Next, a case where the blades 107 are diskless blades having no external storage device will be explained.

The blades 107 connect to the external storage devices 108 through the network 111 (FIG. 1). OS, applications and other software programs used in jobs and data are stored in storage areas in the external storage devices 108. The blade 107 loads into memory the software it uses from the external storage device 108 via the network 111. The CPU in the blade 107 executes the loaded software to provide the P2P type terminal service.

Here, to check whether the blade 107 has an external storage device, the service management server 101 adds to the computer management table of FIG. 8 information indicating whether the blade 107 has an external storage device (802, described later).

FIG. 8 shows an example configuration of the computer information table managed by the service management server 101. In addition to the information registered in the computer management table shown in FIG. 5, the computer information table of FIG. 8 has a type field 802. Although it may have the usage state field 810, the field is not used in this embodiment. The usage state field 810 will be explained in embodiment 5. The type of the blade 107, either disk type or diskless type, is entered beforehand by the administrator.

FIG. 9 shows a configuration of the storage area management table managed by the external storage device management server 104.

The storage area management table has a device ID field 901 in which to register an identifier of the external storage device 108, an LU number field 902 in which to register an identifier of the logical disk unit 109, a user ID field 903 to manage the logical disk unit 109 allocated to the user 100, a port number and address field 904 in which to register a port number and address for accepting an access from the blade 107, a computer address field 905 in which to register an address of the blade 107 having an access right, and a status field 906 indicating whether the external storage device 108 is available for use.

Figure 10:
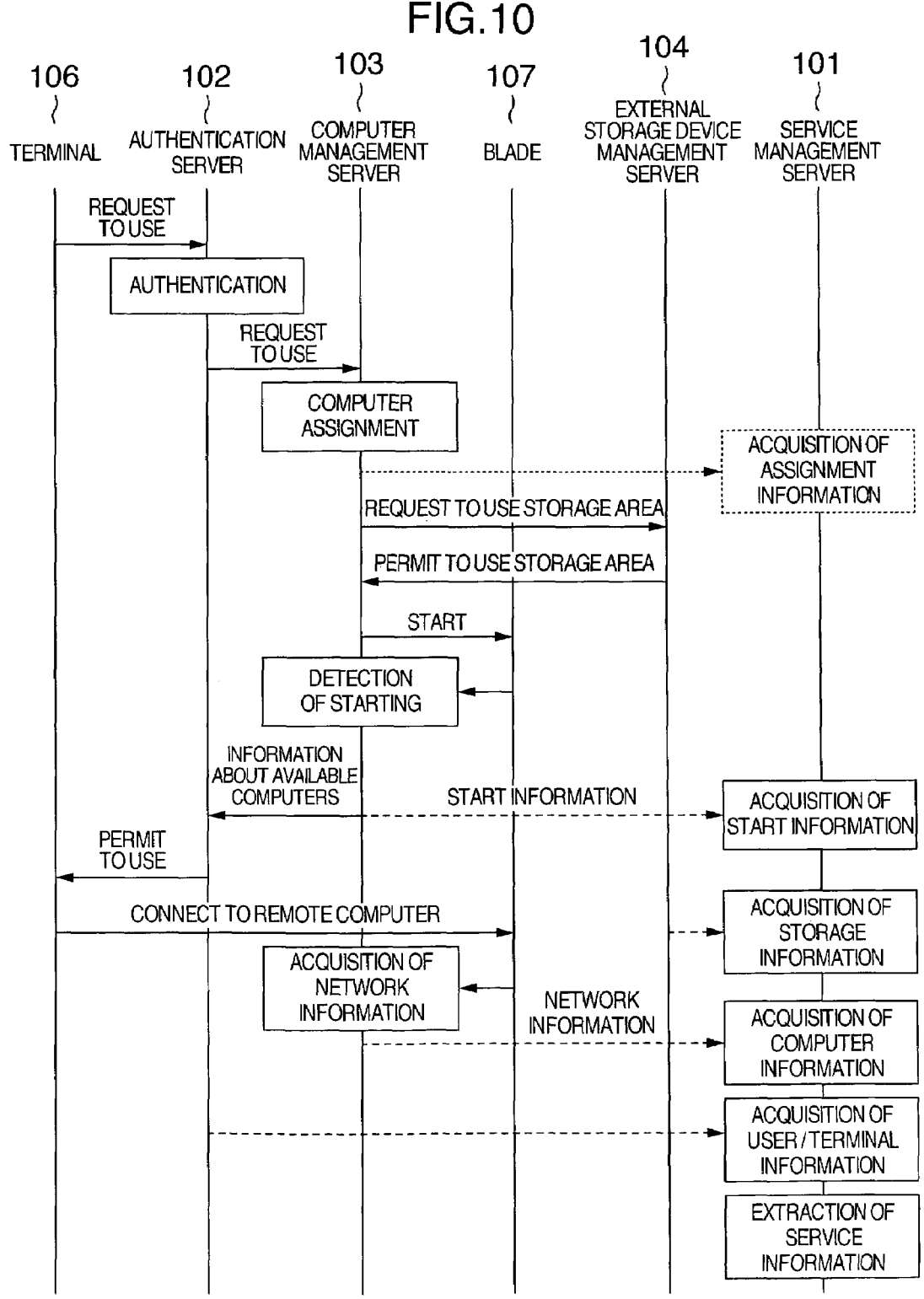
FIG. 10 is a diagram showing a sequence of steps corresponding to FIG. 7, performed in a system configuration having the external storage device management server 104 of embodiment 1.

FIG. 10 shows a sequence of steps corresponding to FIG. 7, in a system configuration having the external storage device management server 104.

The user 100 using the terminal 106 issues a remote access service request to the authentication server 102. The authentication server 102 checks whether the user 100 is an authorized user of the service and records the user identifier and the IP address as the terminal information and also the time when the user was authenticated. Next, for the user 100 who has passed the authentication, the authentication server 102 notifies the service request to the computer management server 103, which then determines the blades 107 available for use.

If the blade 107 is a diskless blade having no hard disk, a storage area is required to start the blade 107. So, the computer management server 103 requests the external storage device management server 104 to use the storage area allotted to the user 100.

The external storage device management server 104 performs setting to mount the storage area of the user 100 on the blade 107 and notifies a use permission to the computer management server 103. The external storage device management server 104 records an IP address of the blade 107 to which an access right is to be given.

The assignment of the blade 107 may be done not by the computer management server 103, but by the external storage device management server 104 (not shown) according to the storage area usage request by the blade 107 (not shown). In that case, the external storage device management server 104 notifies the computer management server 103 of the assignment result.

If the blade 107 permitted to be used by the user 100 is not yet started, the computer management server 103 starts the blade 107. When it detects the start of the blade 107, the computer management server 103 notifies the use permission and the information on the blade 107 to the user 100 of the terminal 106 through the authentication server 102.

Upon receiving the use permission from the authentication server 102, the terminal 106 of the user 100 connects to the remote blade 107. The computer management server 103 obtains the connection information of the terminal 106 through the blade 107.

When the blade 107 is started, the service management server 101 acquires the start information from the computer management server 103. The service management server 101 acquires from the external storage device management server 104 the mount information (storage information) on the storage area for the blade 107.

Further, after the terminal 106 initiates the procedure for connecting to the blade 107, the service management server 101 acquires the connection information (computer information) of the blade 107 from the computer management server 103. It also acquires information about the user 100 and its terminal 106 from the authentication server 102. Based on the information obtained, the service management server 101 recognizes the relation among the user 100 that has initiated the connection procedure, its terminal 106, the remote blade 107, and the external storage device, and extracts the service usage information.

Figure 11:
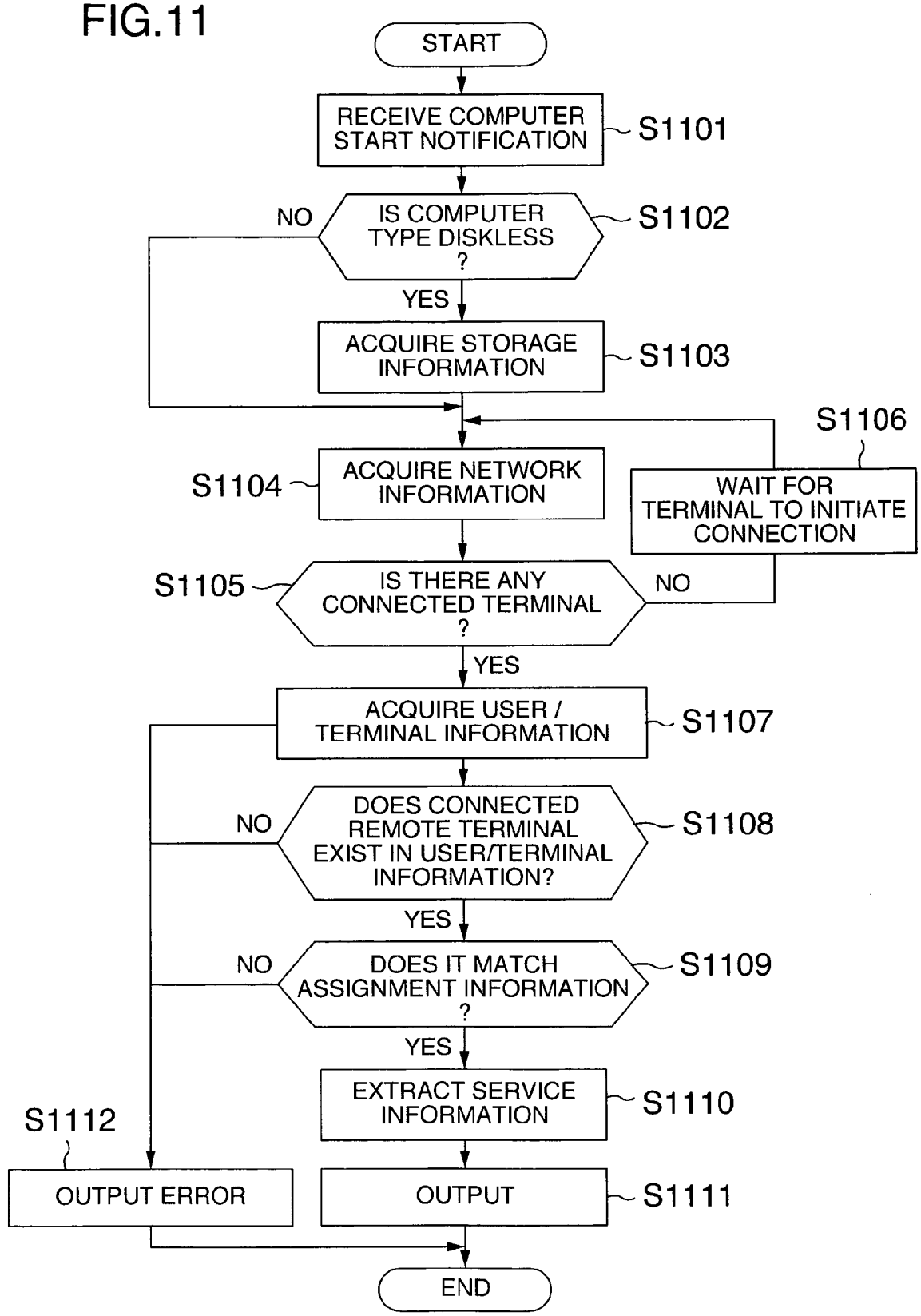
FIG. 11 is a flow chart showing a service information extracting operation performed by the service management server 101 in embodiment 1.

FIG. 11 shows a flow chart of a service information extracting process executed by the service management server 101.

The service management server 101 receives a blade start notification from the computer management server 103 that has detected the start of the blade 107 (S1101) and initiates this process. A check is made as to whether the started blade 107 is the type that has no storage area in it (S1102). If so, the service management server 101 acquires the information on the mounted storage area (storage information) from the external storage device management server 104 (S1103). Then, it acquires the network information on the blade 107 (S1104) and checks if there is any connected terminal 106 for the terminal service (S1105). If there is no terminal, the service management server 101 waits for the terminal 106 to start the connection procedure (S1106) and acquires the network information (S1104).

Next, the service management server 101 acquires information on the authenticated user 100 and its terminal 106 from the authentication server 102 (S1107). By checking the network information against the terminal information, the service management server 101 confirms that the connected terminal 106 of the blade 107 is the terminal 106 of the authenticated user 100 (S1108). If they fail to match, the check result is issued as an error.

Next, the service management server 101 checks whether the blade 107 to which the user terminal 106 is connected and the storage area mounted on the blade 107 are correct, according to the assignment information on the blade 107 for the user 100 if it has already acquired the assignment information or according to the assignment information on the storage area if the blade 107 is of the type that mounts the storage area (S1109).

If the assignment information is correct (S1109, Yes), the server 101 extracts the connected state of the user 100, the terminal 106, the blade 107 and the storage area as the service information (S1110), registers it with the management database 306 (FIG. 3) and outputs it (S1111). The output operation includes an output to files, an output to a display, and an output that is recognizable by the administrator using the service management server 101. If the assignment information is not correct (S1109, No), the check result is issued as an error (S1112).

With the above steps, the information on the user 100 that is making a remote access, the terminal 106 being used by the user 100, the blade 107, and the external storage device 108 and the storage area as the external storage device can be extracted and managed. The explanation up to this point concerns the information extracting process performed when the user 100 begins to use the service.

Next, the process performed when the user 100 ends the use of the service will be explained. The flow chart for this process is omitted.

The use of the service may be ended by cutting off the connection with the remote blade 107 or by shutting down the blade 107. The user 100 sends from the terminal 106 to the authentication server 102 an interrupt request if the connection is to be cut off or an end request if the blade 107 is to be shut down. The authentication server 102 notifies the received request to the computer management server 103, which in turn executes the end procedure for the blade 107. After the end procedure is successfully executed, the computer management server 103 notifies the service management server 101 of the changed state of the blade 107 and the time.

Upon reception of the notification, the service management server 101 searches through the managed information for those information whose computer ID matches and changes the usage state to "interrupted" or "stopped". At the end of the process, it also records the time when the usage state was changed. Since the terminal IP address 403 (FIG. 4) may change from one connection to another, "none" is recorded in the address field when the usage is ended.

When a blade 107 with no storage area is to be shut down, since the blade 107 that is available for use by the user 100 may not be available the next time, the computer ID 404 is set with "none". There is another end procedure which involves ending the remote access to the blade 107 directly from the terminal 106. In this case, the computer management server 103 detects a cutoff of connection or a shutdown.

The detection of the connection cutoff or shutdown may be accomplished by the computer management server 103 periodically checking the state of the blade 107, or by the blade 107 notifying the computer management server 103 of the change in the terminal service connection information or the shutdown.

With the above steps, the remote access service information on the user 100, the terminal 106 used by the user 100, the blade 107, and the external storage device 108 and the storage area as the external storage device can be managed in real time. The explanation up to this point concerns the information extracting process performed when the user 100 begins to use the service.

2. Second Embodiment

As another example of this invention, a case where the service management server 101 accepts a user request will be explained.

Figure 12:
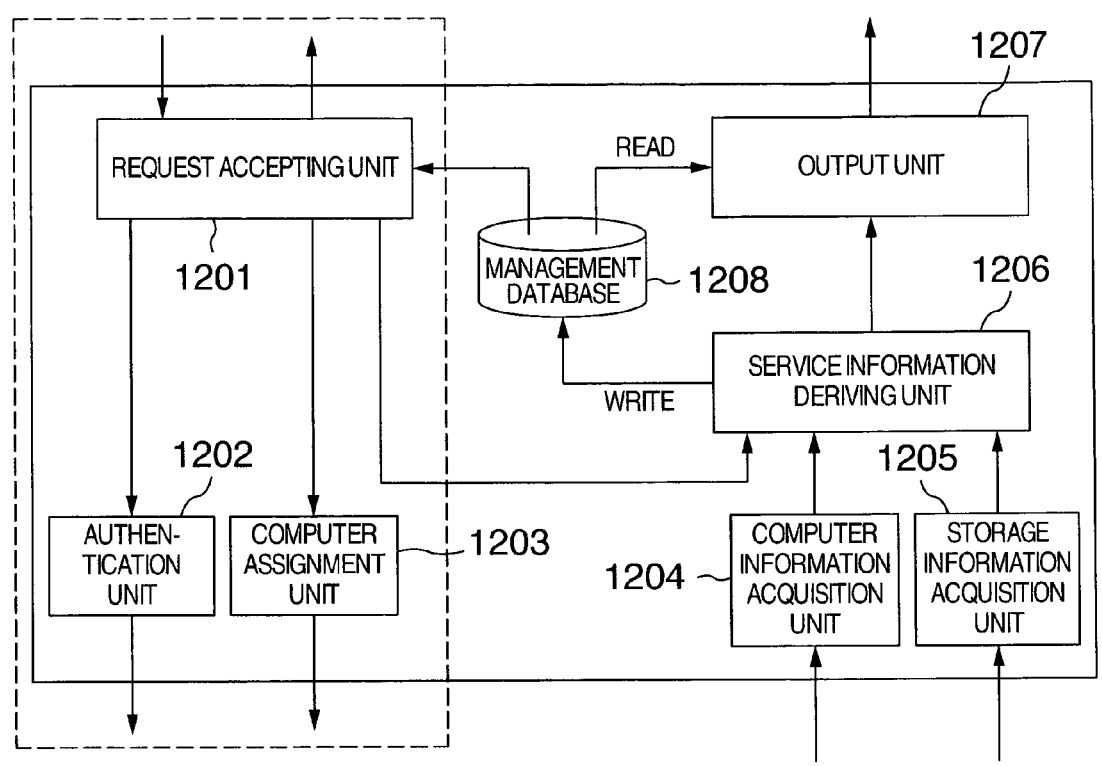
FIG. 12 is a functional module configuration diagram of a service management program executed by a service management server 101 in embodiment 2.

FIG. 12 shows a functional module configuration of a service management program executed by the service management server 101. The points in which this module configuration differs from that of the first embodiment of FIG. 3 are:

1) The functional module of this embodiment has additional units, which include a request accepting unit 1201 to accept a request from the user 100, an authentication unit 1202 that, at the time of request acceptance, requests an authentication of the user 100 from the authentication server 102, and a computer assignment unit 1203 that requests from the computer management server 103 an assignment of the blade 107 to the authenticated user 100.

2) Since the information on the user 100 and its terminal 106 is acquired by the request accepting unit 1201, the module does not have the user information acquisition unit 301.

A computer information acquisition unit 1204, a storage information acquisition unit 1205, a service information extracting unit 1206, an output unit 1207 and a management database 1208 are the same as the counterparts in the first embodiment.

Figure 13:
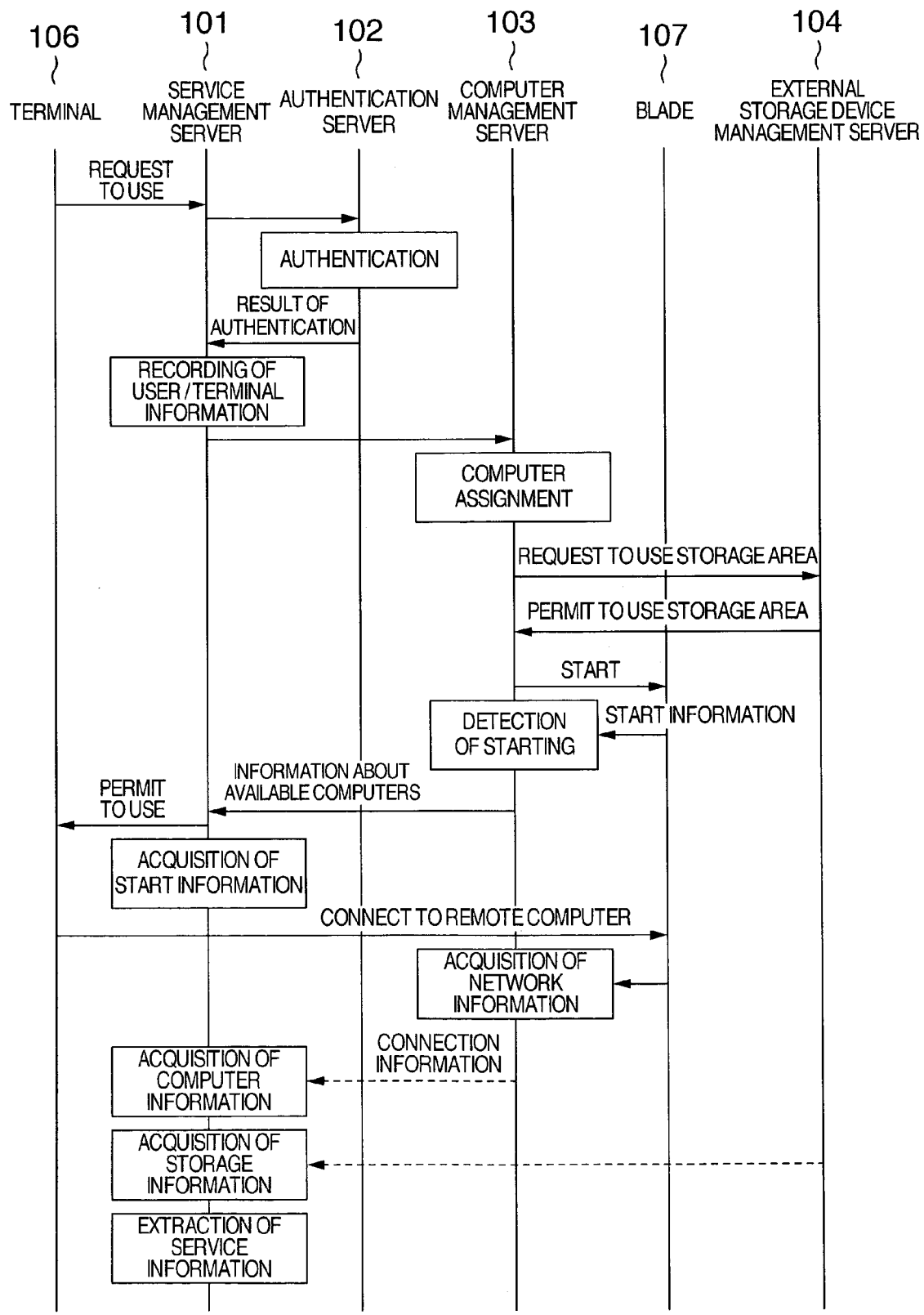
FIG. 13 is a sequence of steps showing an information transfer among servers and a blade 107 in embodiment 2.

FIG. 13 shows a sequence of steps performed between servers and the blade 107 in the second embodiment.

The user 100 using the terminal 106 issues a remote access service request to the service management server 101. To check if the user 100 is an authorized user, the service management server 101 notifies the user information to the authentication server 102 and receives a check result from the authentication server 102.

If the user 100 is found to be an authorized user for the service, the service management server 101 records a user identifier, an IP address as the information on the terminal 106 being used and the time when the user was authenticated. Here, rather than acquiring the information on the user management table shown in FIG. 6 of the first embodiment from the authentication server 102, the service management server 101 keeps the user management table and records it. In the authentication time field 603 the time when an authentication result was received is recorded. If the authentication fails, the user is notified that he or she cannot use the service.

Next, for the user 100 who has passed the authentication, the service management server 101 sends a request to the computer management server 103 to determine a usable blade 107. If the blade 107 does not have a hard disk, an external storage area is required when the blade 107 is started. So, the use of the storage area allotted to the user 100 is requested to the external storage device management server 104.

The external storage device management server 104 executes setting to mount the storage area of the user on the blade 107 and notifies a use permission to the computer management server 103. The external storage device management server 104 records an IP address as the information on the blade 107 to which an access right is given.

The assignment of the blade 107 may be performed by the external storage device management server 104 or the service management server 101, rather than the computer management server 103. When the assignment is done by the service management server 101, the result of assignment is notified to the computer management server 103 and the external storage device management server 104.

When the computer management server 103 receives the notification from the external storage device management server 104, if the blade 107 permitted to be used by the user 100 is not yet started, the server 103 starts the blade 107. The server 103 notifies the service management server 101 when it detects the start of the blade 107.

The service management server 101 notifies the user 100 of the terminal 106 of the use permission of the blade 107 and the information on the blade 107. Here, the service management server 101 also records the information on the started blade 107 as the computer management information. After receiving the use permission, the terminal 106 of the user 100 connects to the remote blade 107. The computer management server 103 acquires the connection information on the terminal 106 from the blade 107. The service management server 101 receives the connection information from the computer management server 103.

The step performed by the service management server 101 to acquire the storage information from the external storage device management server 104 may be preceded or followed by the step of acquiring the network connection information from the computer management server 103.

Based on the acquired information, the service management server 101 recognizes the relation among the user 100 that has initiated the connection procedure, its terminal 106, the remote blade 107 to which the terminal 106 connects, and the external storage device 108 and extracts the service usage information.

The above is the sequence of steps performed when the service starts.

As in the first embodiment, the service management server 101 acquires information also at the end of the service and manages the end of the service usage (not shown).

The user 100 sends from its terminal 106 an interrupt request or an end request to the service management server 101. Upon receiving the request from the user 100, the service management server 101 notifies it to the computer management server 103, which then executes the end procedure. After completing the end procedure successfully, the computer management server 103 notifies the changed status of the blade 107 and its time to the service management server 101.

The service ending operation may be performed on the remotely accessed blade 107 directly from the terminal 106. In this case, the computer management server 103 detects a connection cutoff or a shutdown and notifies it to the service management server 101. Upon reception of the notification, the service management server 101 records the changed status in the managed information, as in the first embodiment.

In the configuration where the service management server 101 accepts a request from the user 100, the above process allows for the real time management of the information about the user 100 requesting the remote access service, the user terminal 106, the blade 107, and the external storage device and storage area.

3. Third Embodiment

A configuration of the third embodiment that allows for the acquisition of the network information in the configuration of the first embodiment and the second embodiment is described below. The network management server 105 in the system configuration of FIG. 1 is used in the third embodiment.

The configuration of the network management server 105 is the same as shown in FIG. 2 and executes the network management program. In a system configuration having blades 107 centralized in a data center, a network in the center to which the blades 107 are connected is within the range of management.

That is, the terminal 106 of the user 100 can connect to the blades in the data center if it can reach the data center from a wide area network, a wireless network, a telephone circuitry and other network 110. The external network 110 to which the user terminal 106 is connected is outside the range of management.

The network management server 105 collects network addresses, gateway addresses and other network information from network devices within an area of management. If the network has a plurality of broadcast domains connected through routers, the network management server 105 gathers routing information from the network devices and manages connection information among the broadcast domains. It also manages port information and port statuses as configuration information on the network devices.

When compared with the functional module configurations of the first embodiment shown in FIG. 3 or the second embodiment shown in FIG. 12, the service management server 101 has a network information acquisition unit. The functional module of embodiment 3 follows FIG. 3 or FIG. 12 and thus its configuration is not shown.

Referring to FIG. 13, the sequence of steps performed in the system configuration of embodiment 3 will be explained, with similar steps to those of FIG. 13 excluded from the following explanation.

As in the sequence of FIG. 13, the terminal 106 sends a service request to the service management server 101, which in turn sends it to the authentication server 102. From this point onward, the similar steps are taken from the start of the blade 107 to the connection of the remote computer. These explanations concern the service information extracting unit and also apply to a case where the sequence of embodiment 1 shown in FIG. 1 or FIG. 10 is followed.

When the terminal 106 begins to connect to the blade 107 after the blade 107 has been started, the service information extracting unit of the service management server 101 acquires information from the network management server 105 through the network information acquisition unit, according to the IP address information on the blade 107 and the IP address information on the terminal 106. The information acquired includes a link of the broadcast domain through which a communication is established from the domain used by the terminal 106 to the blade 107, and a list of network devices in the management area to realize the communication. The information acquired about the network devices includes identifiers of connection ports that connect the domains, statuses of the ports, network addresses and management IP addresses of the ports.

If an external storage device exists outside as in embodiment 2, the service information extracting unit of the service management server 101 also extracts, through the network information acquisition unit, information on routing between the blade 107 and the external storage device based on the IP address information assigned to the port of the blade to be connected to the external storage device and the IP address information of the corresponding external storage device.

FIG. 14 shows an example configuration of the network information table managed by the service management server 101 based on the routing information acquired by the service information extracting unit. The information is managed for each network interface of the blades 107.

In the configuration of FIG. 14, there are two interfaces, one connected to the terminal 106 of the user 100 and one to the external storage device 108. The network information table has a computer ID field 1401, interface number fields 1402, 1407 in which to register interface identifiers, IP address fields 1403, 1408, subnet address fields 1404, 1409, remote address fields 1405, 1410, and on-route device address fields 1406, 1411.

In this example, as for the interface number if1, it is in a different subnet than the user terminal 106 and the connection to the user terminal 106 passes through two or more different networks. So, the addresses of the on-route devices through which the blade 107 connects to the terminal 106 are managed. As for the interface number if2, it is in the same subnet as the external storage device 108 and its connection to the external storage device does not pass through on-route devices.

With the above arrangement, the information on the user 100 requesting the remote access service, the user terminal 106, the blade 107, external storage device and storage area, and the networks can be managed in real time.

4. Fourth Embodiment

In the system configuration of the first embodiment, an explanation is given concerning the steps performed by an administrator of the blade 107, an administrator of the external storage device 108 and an administrator of other network system in executing management and operation of the system. An example work to be described below concerns an updating of hardware or software of the system and a restoration procedure in the event of failure.

Figure 15:
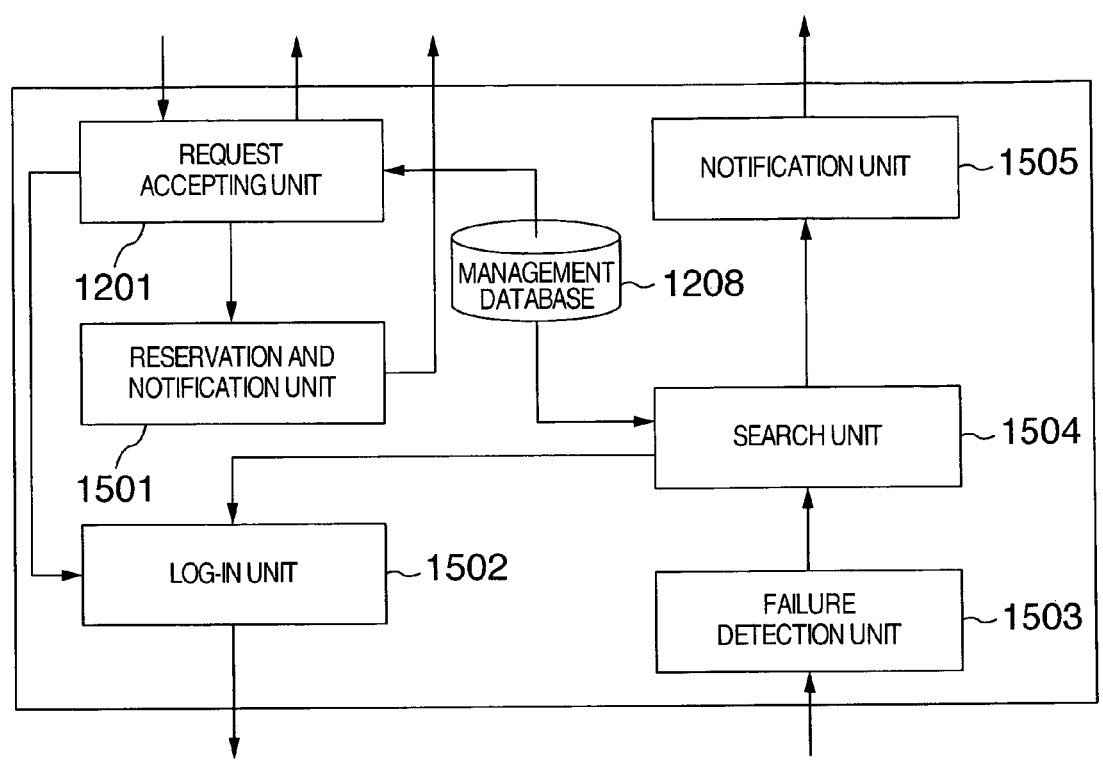
FIG. 15 is an explanatory diagram showing an added functional module in a service management server 101 in embodiment 4.

In the functional module configuration of the service management program executed by the service management server 101 of this embodiment, FIG. 15 shows only a log-in unit which is added to the functional module configuration of the second embodiment shown in FIG. 12. That is, in FIG. 15 (added functional module), those units in FIG. 12—the authentication unit 1202 used when accepting a request, the computer assignment unit 1203, the computer information acquisition unit 1204 for extracting information, the storage information acquisition unit 1205, the service information extracting unit 1206 and the output unit 1207—are not shown.

In the fourth embodiment, to the functional module configuration of the service management program are added a log-in unit 1502 to log in to the blade 107 according to a request from the terminal 106, a reservation and notification unit 1501 to reserve the use of the blade 107 when the blade 107 currently not available becomes available, a failure detection unit 1503 to receive failure information, a search unit 1504 to search through the management database 1208, and a notification unit 1505 to issue a notification to the user 100 or administrator.

The request accepting unit 1201 accepts use, halt and end of use requests and others from the user 100, and also accepts use, halt and end of use requests and others from the administrator. The reservation and notification unit 1501 is a functional module used in explanations of the reservation function when the service management server 101 has that function. The failure detection unit 1503, the search unit 1504 and the notification unit 1505 are functional modules 1504 used in explanations when a failure has occurred. Here, as an example management work, we will explain about a case where an administrator or a management program updates software of the blade 107.

Figure 16:
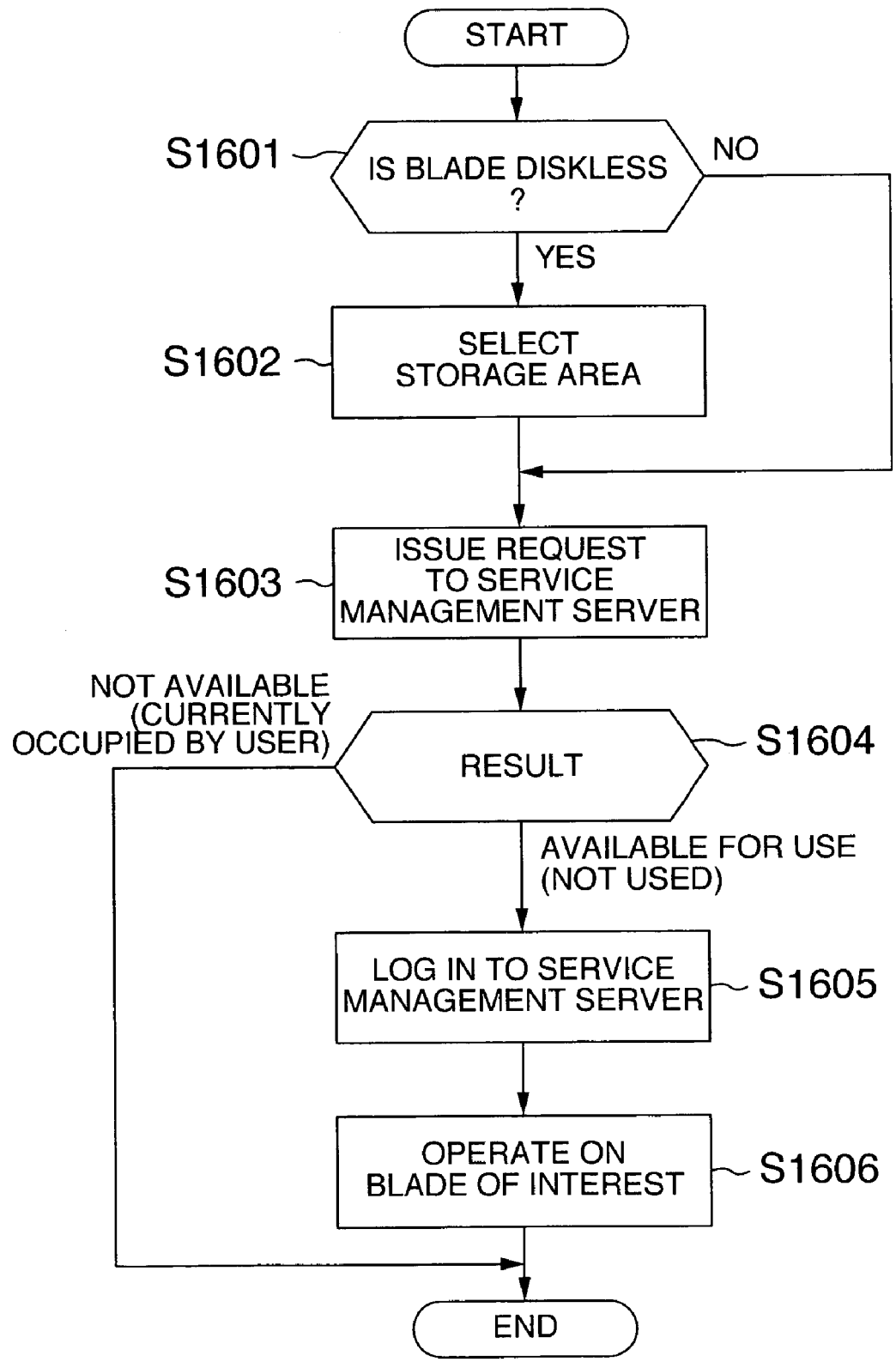
FIG. 16 is a flow chart showing a work procedure performed by an administrator or management program in embodiment 4.

FIG. 16 is a flow chart showing a sequence of steps performed by the administrator or management program (hereinafter simply referred to as an "administrator").

The administrator checks whether the blade 107 that loads the software of interest is a diskless blade (S1601). If it is a diskless blade, the administrator selects a storage area (S1602). The administrator searches through the management database or checks the output information of the service management server to determine the type of the blade 107 and select the storage area.

Then, the administrator issues to the service management server 101 a request to use of the selected blade 107 or storage area (S1603). The administrator receives a response (S1604) and, if the blade 107 is currently not used and is therefore available for use, logs in to the service management server 101 (S1605). The service management server 101 has remotely logged in to that blade 107 with an administrator authority and the administrator executes the work on the blade 107 (S1606).

If the blade 107 is occupied by the user and cannot be used by the administrator, the administrator does not perform the work.

In the case of a diskless blade, the blade 107 that was assigned when the requested storage area was permitted to be used has already mounted the storage area and is running. The administrator performs the work in that blade 107. Here, in some cases, rather than performing the log-in operation on the blade 107, the service management server 101 may notify the administrator of the information on the available blade 107 (IP address, administrator account, password, etc.). In that case, the administrator, based on the notified information, can directly remote-log in to the blade 107 and perform the work.

The operation performed by the service management server 101 will be explained.

The service management server 101 manages the state of use of the blade 107. It uses the usage state field 810 in the computer information table shown in FIG. 8. In the usage state field 810 one of states—used by user, used by administrator, not used and prohibited—is registered. When the blade 107 is being used by user, the user ID is registered so that it is recognized as being used by the user 100. When the usage state 402 (FIG. 4) for the user 100 is "connected" or "interrupted", the blade is taken as being used. The "use prohibited" is a state that is set when the blade 107 is failed. If "use prohibited" is set, the user 100 cannot use the blade 107.

Figure 17:
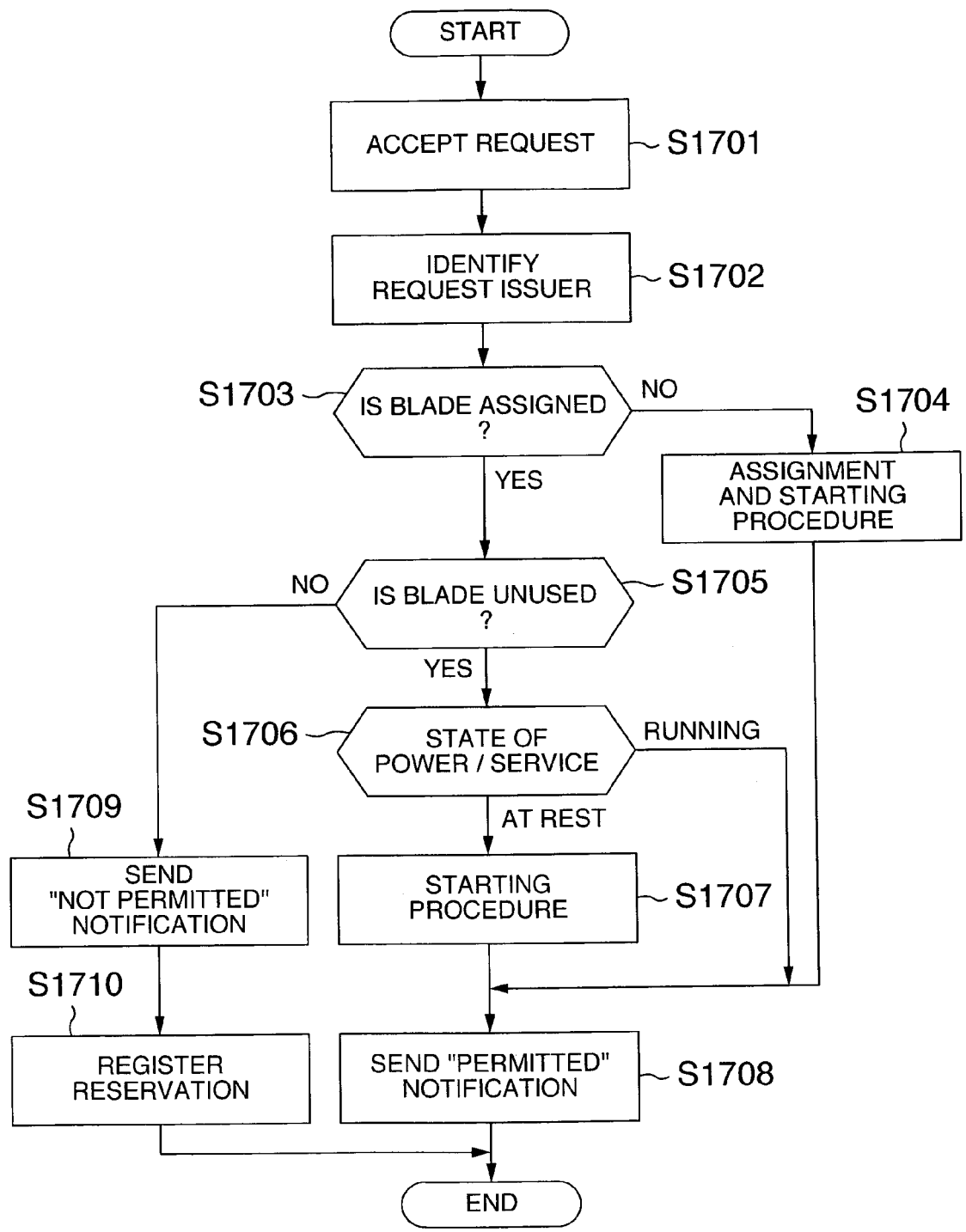
FIG. 17 is a flow chart showing operations performed by the service management server 101 when a service request is issued from the user 100 in embodiment 4.
Figure 18:
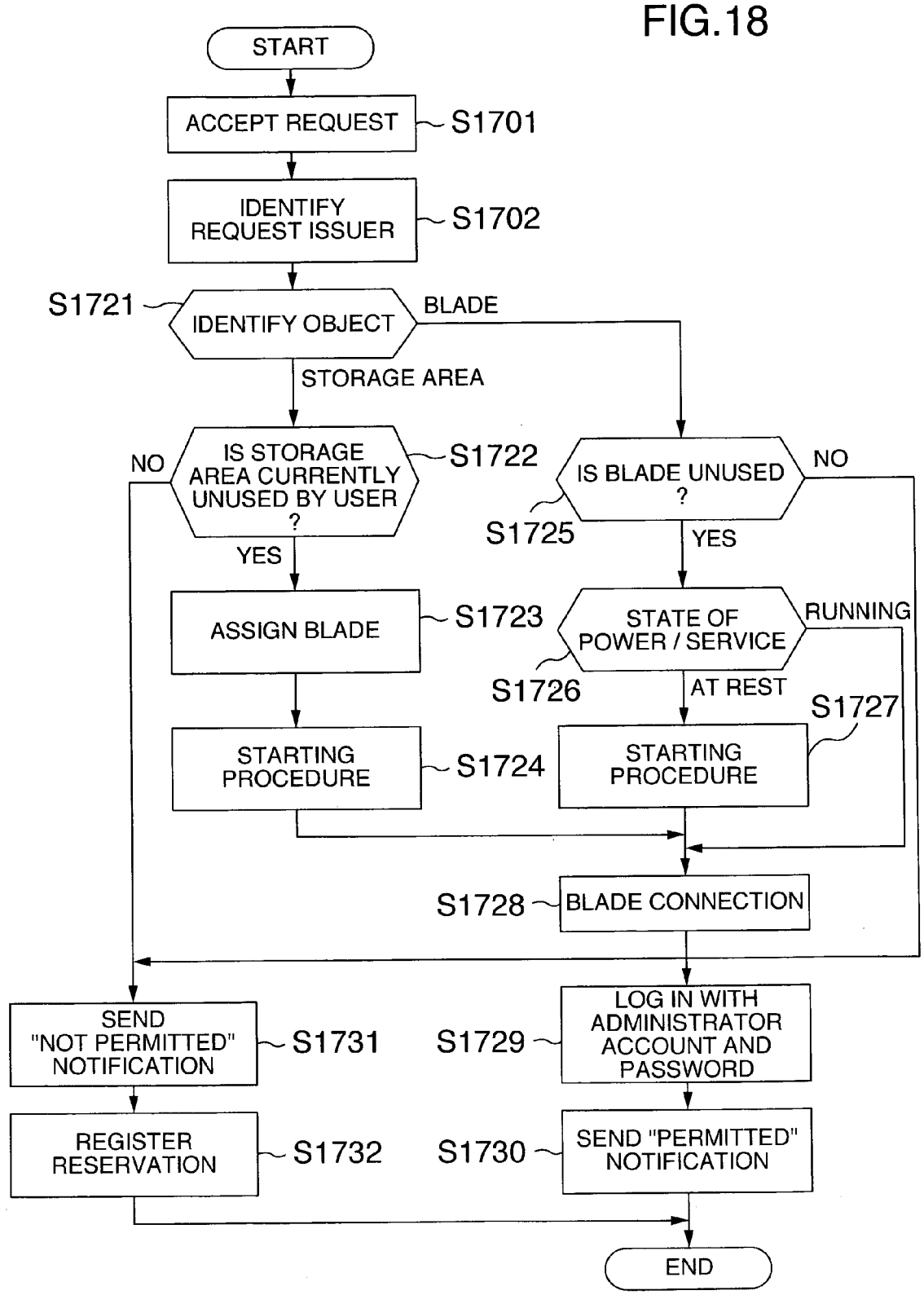
FIG. 18 is a flow chart showing operations performed by the service management server 101 when a service request is issued from the administrator in embodiment 4.

FIG. 17 and FIG. 18 show flow charts of steps performed by the service management server 101 when it accepts a service request. FIG. 17 represents a case where the service request is issued by the user 100 and FIG. 18 represents a case where it is issued by the administrator.

The service management server 101 in FIG. 17 accepts a service request (S1701) and identifies the request issuer (S1702). The operation performed when the request issuer is a user 100 is similar to that of embodiment 2 except that, when the administrator is using the service, the administrator is notified that the service has been requested. It is checked whether the assignment of blade 107 to the user 100 is already determined (S1703). If there is any assigned blade 107, its usage state is checked (S1705).

If the blade 107 to be assigned is already being used by the administrator or prohibited from use, a "not permitted" notification is sent in response to the request (S1709). If a user 100 is using the blade 107 but differs from the user 100 who has issued the current request, this is notified as error to the administrator. At the same time, a "not permitted" notification is sent to the user (not shown).

If there is no allocated blade 107, the computer allocation is executed and, when the allocated computer is not running, it is started (S1704). When the computer becomes available for use, a "permitted" notification is sent (S1708). When the usage state of the blade 107 is a "not used" state, the power and service state are checked (S1708). If the blade 107 is not operating, it is started (S1707). When the blade 107 becomes available for use, a permission is sent (S1708).

When the administrator issues a service request to the service management server 101, as shown in FIG. 18, the server 101 accepts the request specifying the blade 107 or storage area to be used (S1701). After the issuer is identified (S1702), an object to be used is checked (S1721). If a storage area is specified, the server 101 connects to the blade 107 mounting the storage area and searches through the management database 1208 (FIG. 12) to see if there is any user 100 using that storage area. If it is found that the storage area is currently not used (S1722, Yes), a blade 107 at rest is assigned (S1723) and the storage area is mounted on the blade which is then started (S1724). If the blade 107 is being used by a user (S1722, No), a "not permitted" notification is sent as a response to the administrator (S1731).

If, in the step of determining the object to be used (S1721), the blade 107 is specified, the usage state of the blade 107 is checked. If the blade 107 is not used (S1725, Yes), a further check is made of a power state and service state (S1726). If the blade 107 is found to be at rest, it is started (S1727). If the blade 107 is being used a user (S1725, No), the server 101 sends a "not permitted" notification as a response to the administrator (S1731).

In step S1725, it is possible that even when an administrator is using the blade 107, another administrator may be using it. So, a "not permitted" notification is sent as a response to the administrator, as when the blade 107 is being used by a user (S1731). If at step S1722 and S1725 the usage state is "use prohibited", since the "use prohibited" means a prohibition of use by a user, a "permitted" notification is sent to the administrator through a predetermined flow (S1730).

When the blade 107 is started (S1724, S1727), the service management server 101 connects to the blade 107 (S1728) and logs in using the administrator's account and password (S1730). Here, the service management server 101 may not perform the log-in operation on the blade 107. In that case, the server 101 notifies the administrator of the blade information (IP address, administrator account, password, etc.) along with the "permitted" notification before ending the procedure.

Next, a case where the service management server 101 has a reservation function will be explained.

Here, the reservation and notification unit 1501 shown in FIG. 15 is used. In the flow charts of FIG. 17 and FIG. 18, if the service management server 101 does not accept the request in the request accepting unit 1201 (FIG. 15) because the user 100 or administrator is using the service, it then reserves the use (S1710 or S1732). The service management server 101 keeps a reservation management table and registers information.

FIG. 19 shows an example configuration of the reservation management table.

The reservation management table has a reserver ID field 1801 in which to register a user ID or administrator identifier, a reserved time field 1802, and a reserved object field 1803 in which to register an ID of the blade 107 or storage area of interest. Then, when the user 100 or administrator currently using the blade 107 ends its use, bringing the usage state of the blade 107 to the "not used" state, the server 101 notifies the reserver or reservation program specified in the reserver ID field 1801 and deletes the associated entry from the reservation management table. The notification here may be done by an e-mail, a response request to the server and other electronic communication means. When the use by the user 100 is prohibited because of hardware update for example, the administrator issues a prohibit request to the service management server 101 to set the usage state into a "use prohibited" state.

As described above, by using the service usage information, the administrator can execute the management work while the user 100 is not using the service. Further, when the user 100 requests through its terminal 106 the use of the blade 107 that the administrator is working on, the administrator can know what is going on.

As another management work, a response in the event of a failure will be explained.

The administrator receives trouble notifications (complaints) from a user such as the user 100 being unable to connect to a blade 107 and being kept waiting for long hours. The administrator then searches through the service usage information managed and output by the service management server 101 to identify the blade 107 to which the user 100 has connected, the connection path, the storage area mounted on the blade 107 and other management information. Based on these information, the administrator checks if the blade 107 is failed and takes necessary steps for the failure.

The user 100 may notify the trouble to the service management server 101. Then, the service management server 101 sends the trouble information received and the related service usage information to the administrator, who in turn can deal with the situation accordingly in the same way as described above.

The operation of the service management server 101 performed when the administrator deals with a failure will be explained by referring to FIG. 15 (added functional module).

The failure detection unit 1503 receives a trouble notification from the user 100 or a failure occurrence notice from other management server and hands the user ID, computer ID and other management information notified by the failure occurrence notice to the search unit 1504. The search unit 1504, as explained in the first embodiment, the second embodiment or the third embodiment, searches through the management databases 306, 1208 in which extracted service usage information is recorded. The notification unit 1505 notifies the search result to the administrator.

If the failure detection unit 1503 receives a failure occurrence notice from other management server, the service management server 101 searches for a related user 100 or a user 100 whose usage state is a "connected" or "interrupted" state, and notifies the failure occurrence to the searched user 100. The notification to the administrator or user 100 may be accomplished by an e-mail, by displaying on an output screen in the service management server or by other electronic communication means. The notification method is not limited to any particular means. Further, another use of service information includes a calculation of operation statistics and an output of monitor logs.

For all blades 107 managed by the service management server 101, the operation statistics calculation is performed by the server 101 periodically acquiring a connection percentage of the user 100 and a usage time from the start to the end of operation of the blade 107. By periodically acquiring the connection percentage of the user 100, an effective resource utilization can be made.

An example log of use by a user is shown in FIG. 20. This log is kept by outputting to a file information about from when and up to when (duration of use) the user 100 used which blade 107 and storage area (hardware resources) from where on the network and along which path (communication path). This file is then stored.

By extracting and managing service information in real time as described above, this invention makes it possible to deal with a failure of the remote access service, provide statistics information for effective utilization of resources, and gather information useful in efficiently keeping a monitoring log and in performing service operations.

This system can be applied to the management of terminal services that can flexibly deal with variations in the number of accesses.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method for managing a computer system by sending information over a computer network, the method comprising:
   authenticating a user of a client terminal upon receipt at an authentication server of a computer use request from the client terminal and transferring the computer use request from the authentication server to a computer management server over the computer network after the user is authenticated;
   selecting a remote computer by the computer management server, the remote computer selected from among two or more system remote computers available over the computer network, and sending information about the selected remote computer from the computer management server to the authentication server after a time when the selected remote computer has been started;
   obtaining connection information at the computer management server from the selected remote computer and providing permission to use from the computer management computer to the client terminal for connection of the client terminal to the selected remote computer;
   obtaining connection information at a service management server from the computer management server for the connection of the client terminal to the selected remote computer;
   connecting the client terminal to the selected remote computer without communication through any one of the authentication server, computer management server, and service management server for the connection;
   sending information about the user of the client terminal and about the client terminal from the authentication server to the service management server; and
   extracting service information at the service management server about the client terminal and about the selected remote computer, based on the connection information received from the computer management server, and extracting information about the user of the client terminal and about the client terminal at the service management server based on the information received from the authentication server;
   wherein sending information about the selected remote computer from the computer management server comprises:
      checking whether the selected remote computer has been started or not; starting the selected remote computer, when the checking indicates that the selected remote computer has not been started; and
      detecting a time at the start of the selected remote computer and sending the information about the selected remote computer to the authentication server and the service management server.

2. The method according to claim 1, wherein the extracted service information comprises information that associates the user, the client terminal, and the selected remote computer with each other.

3. The method according to claim 2, wherein the extracted service information includes an ID of the user, an IP address of the client terminal, and an ID of the selected remote computer.

4. The method according to claim 2, wherein extracting service information at the service management server comprises:
   checking whether the client terminal indicated by the connection information coincides with the client terminal indicated by the information about the client terminal received from the authentication server; and
   outputting a result of the checking.

5. The method according to claim 1, wherein obtaining connection information at the service management server comprises:
   responsive to the obtained connection information indicating that the selected remote computer is not connected to the client terminal, repeating obtaining the connection information from the computer management server until the connection information indicates that the selected remote computer is connected to the client terminal.

6. The method according to claim 5, wherein, after the client terminal obtains the information about the selected remote computer from the authentication server and connects to the selected remote computer, sending the connection information from the selected remote computer to the service management server.

7. The method according to claim 1, wherein detecting a time at the start of the selected remote computer comprises receiving a start notice at the computer management server from the remote computer.

8. The method according to claim 1, wherein detecting the start of the selected remote computer comprises querying the selected remote computer as to a start state of the selected remote computer.

9. The method according to claim 1, wherein obtaining connection information at the computer management server comprises:
   receiving the connection information from the remote computer.

10. The method according to claim 1, wherein obtaining connection information at the computer management server comprises querying the selected remote computer as to the connection information of the selected remote computer.

11. The method according to claim 1, further comprising:
   sending information of a remote computer which can be used by the authorized user from the computer management server to the service management server.

12. The method according to claim 1, further comprising:
   calculating operation statistics at the service management server for the selected remote computer from the time the selected remote computer was started to an operation end time of the selected remote computer, based on the extracted service information.

13. A method of providing access between a client terminal and one of a plurality of remote computers in a computer system with a service management server for managing access between the client terminal and remote computers, the method comprising:
- authenticating a user of the client terminal in response to receipt at an authentication server of a request from the client terminal to use a remote computer;
- transferring the use request from the authentication server to a computer management server after the user is authenticated;
- selecting one of the remote computers by the computer management server and sending information about the selected remote computer from the computer management server to the authentication server and a service management server after the selected remote computer has been started;
- obtaining connection information of the client terminal at the computer management server from the selected remote computer and providing permission to use from the computer management computer to the client terminal for connection of the client terminal to the selected remote computer;
- obtaining connection information of the selected remote computer at the service management server from the computer management server;
- connecting the client terminal to the selected remote computer without communication through any one of the authentication server, computer management server, and service management server for the connection;
- sending information about the user of the client terminal and the client terminal from the authentication server to the service management server; and
- extracting service information at the service management server based on the connection information received from the computer management server and information about the user of the client terminal and the client terminal received from the authentication server;
- wherein sending information about the selected remote computer from the computer management server comprises:
  - checking whether the selected remote computer has been started or not; starting the selected remote computer, when the checking indicates that the selected remote computer has not been started; and
  - detecting a time at the start of the selected remote computer and sending the information about the selected remote computer to the authentication server and the service management server.

14. A computer system comprising:
- a service management server device that manages access between a client terminal and one of a plurality of remote computers; an authentication server device that receives a request from the client terminal to use one of the plurality of remote computers and in response authenticates a user of the client terminal;
- a computer management server device that receives the use request from the authentication server a computer management server after the user is authenticated;
- the computer management server selects one of the plurality of remote computers for access by the client terminal and sends information about the selected remote computer to the authentication server and the service management server at a time after the selected remote computer has been started, and receives connection information of the client terminal from the selected remote computer and provides the client terminal with permission to use for connection of the client terminal to the selected remote computer;
- the service management server receives connection information of the selected remote computer from the computer management server; connecting the client terminal to the selected remote computer without communication through any one of the authentication server, computer management server, and service management server for the connection;
- the authentication server sends information about the user of the client terminal and the client terminal to the service management server; and
- the service management server extracts service information based on the connection information received from the computer management server and extracts information about the user of the client terminal and the client terminal received from the authentication server;
- the computer management server device selects one of the plurality of remote computers for access by the client terminal and sends information about the selected remote by:
  - checking whether the selected remote computer has been started or not;
  - starting the selected remote computer, when the checking indicates that the selected remote computer has not been started; and
  - detecting a time at the start of the selected remote computer and sending the information about the selected remote computer to the authentication server and the service management server.

15. The computer system according to claim 14, wherein the service management server calculates operation statistics at the service management server for the selected remote computer from the time the selected remote computer was started to an operation end time of the selected remote computer, based on the extracted service information.

* * * * *